United States Patent

Starp et al.

[15] 3,635,141
[45] Jan. 18, 1972

[54] PHOTOGRAPHIC CAMERA WITH SHUTTER BLADE SYSTEM EXECUTING RECIPROCATING MOTION DURING EXPOSURE

[72] Inventors: Franz W. R. Starp; Vladimir Racki, both of Calmbach, Black Forest, Germany

[73] Assignee: Pronter Weck Alfred Gauthier G.m.b.H., Calmbach, Black Forest, Germany

[22] Filed: Nov. 26, 1965

[21] Appl. No.: 509,888

[30] Foreign Application Priority Data

Nov. 30, 1964 Germany..............................G 42,139

[52] U.S. Cl............................................95/53, 95/59, 95/63
[51] Int. Cl.............................................................G03b 9/58
[58] Field of Search.................................95/53, 58, 59, 63

[56] References Cited

UNITED STATES PATENTS

| 1,222,766 | 4/1917 | Huebner | 95/59 X |
| 2,160,390 | 5/1939 | Peannenstiehl | 95/59 X |
| 2,577,774 | 12/1951 | Lee | 95/53 E |
| 2,999,445 | 9/1961 | Fahlenberg | 95/63 |
| 3,092,002 | 6/1963 | Frenk | 95/58 |
| 2,702,500 | 2/1955 | DeBell | 95/58 |

Primary Examiner—John M. Horan
Attorney—Arthur A. March

[57] ABSTRACT

A reciprocating shutter blade system for a photographic camera comprises a shutter blade system activated by an electromagnet, and a permanent magnet coupled to the shutter blade system and participating in the motion of the shutter blade system. Only one pole of the permanent magnet projects into the magnetic field of the electromagnet.

12 Claims, 4 Drawing Figures

PATENTED JAN 18 1972
3,635,141
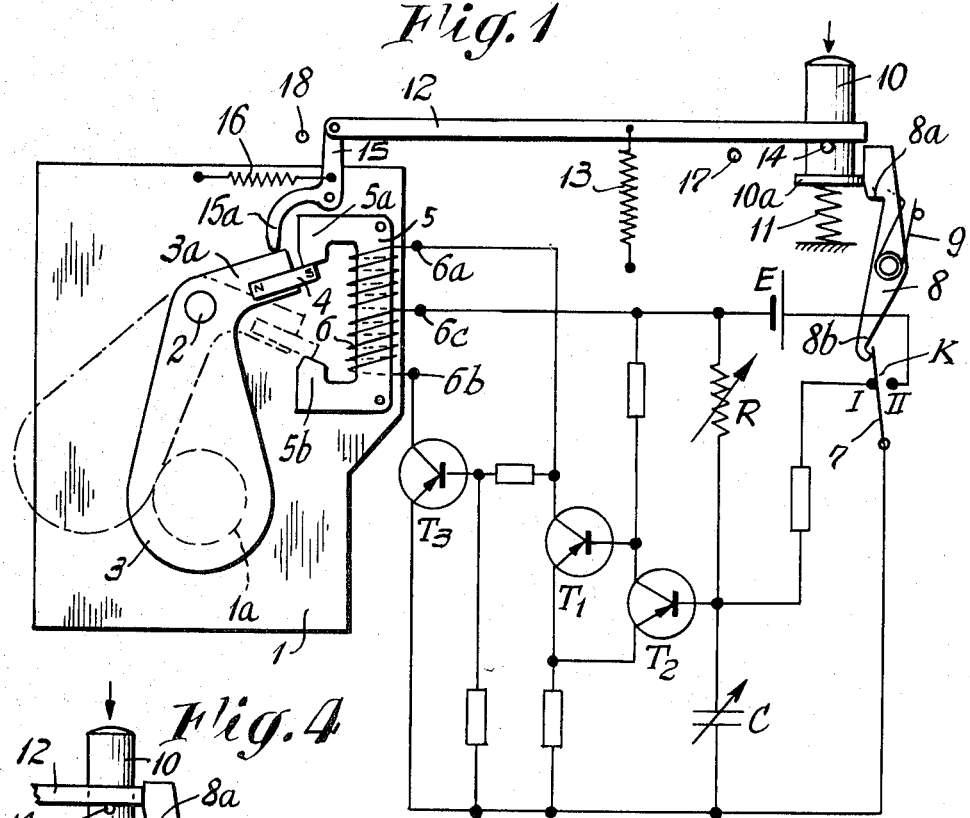
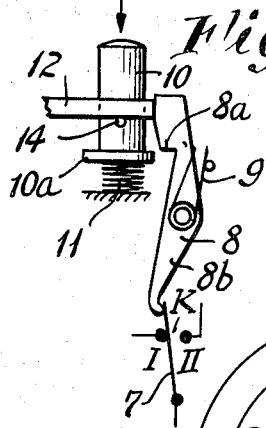
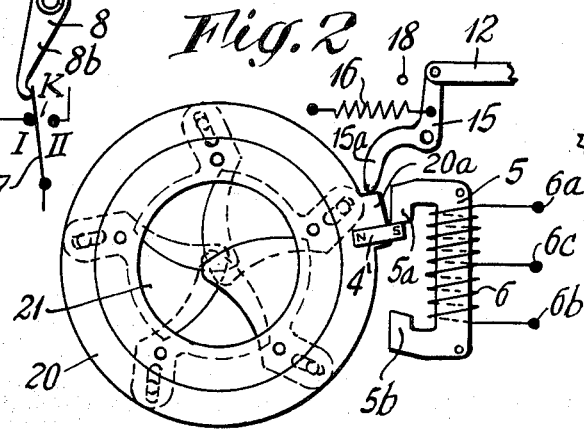
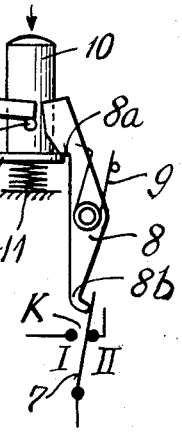
INVENTOR.
Franz W. R. Starp
Vladimir Racki
BY
Arthur A. March
ATTORNEY

PHOTOGRAPHIC CAMERA WITH SHUTTER BLADE SYSTEM EXECUTING RECIPROCATING MOTION DURING EXPOSURE

This invention relates to a photographic camera having a shutter whose shutter blade system, covering the lens aperture, executes a reciprocating motion during the exposure process.

A photographic shutter equipped with an electromagnet controlled by an electronic timing circuit for the purpose of transferring the shutter blades into the open position, is not new. In such shutters the armature cooperating with the electromagnet is coupled to the shutter blade driving ring by means of a lever system. The lever system is, in turn, acted upon by a tension spring which serves to restore the armature of the magnet, or to return the shutter blades to the starting position. However, this arrangement as existing heretofore, is unsuitable on practical grounds, because it requires a given specific air gap between electromagnet and armature, corresponding to the opening and closing motion of the shutter blade ring. In addition, a tension spring is required to exert on the lever system a considerable restoring moment which acts counter to the moment resulting from the attraction of the electromagnet.

It is therefore an object of this invention to provide a photographic shutter suitable for practical needs, which operates on electromagnetic basis and makes possible a time-dependent opening and closing motion of the shutter blade system with a minimum of structural parts. It is intended that this photographic shutter avoid, at the same time, detrimental effects on the capacity of the power supply provided for energizing the electronic operating device.

To accomplish this object, the invention provides a permanent magnet which participates in the motion of the shutter blade system, and is coupled to the shutter blade system. An electromagnet capable of polarity reversals through means of an electronic switching device, is associated with the permanent magnet in such a manner that one of the poles of the permanent magnet projects into the field or lines of force of the electromagnet. In this manner, it is possible to obtain a photographic shutter whose shutter blade system can be transferred into open and closed positions by magnetic forces exclusively. Accordingly, it is thereby possible to dispense with mechanical transmission members. This arrangement produces particularly favorable results in that, at the moment of pole reversal of the magnetic coil, the permanent magnet located in the electromagnetic filed receives an impulse from the pole of the electromagnet to which it had adhered. The permanent magnet is subsequently attracted with the same force by the opposite pole of the electromagnet. Consequently, accelerating forces act on the shutter blade system during the entire opening and closing motions, and these make it possible to obtain comparatively short opening and closing time intervals. In addition, the driving system of the invention makes it possible to reduce to a minimum the masses moved, by avoiding the use of mechanical transmission elements.

It is another object of this invention to provide a simple and functionally unobstructed shutter arrangement in which the blade system consists of a single, pivoted and swivable blade.

It is a further object of this invention to provide that the permanent magnet be fixed directly to the shutter blade. For shutter arrangements in which the shutter blade system os formed of a plurality of shutter blades movable by means of a common driving member, the permanent magnet is preferably mounted on the common driving member of the shutter blade system.

A still further object of this invention is to assure a dependable mode of operation, by providing that the distance between the two poles of the electromagnet be selected so that the permanent magnet alternately engages these poles in its travel for the opening and closing of the shutter blade system. Although the poles of the electromagnet can function as end stops, the arrangement of the invention is primarily intended for the purpose of avoiding air gaps.

An additional object of this invention is to provide an electronic operating device including a contact switch which serves to supply the electromagnet with current. The switch can be actuated directly by means of a pushbutton intended to release the camera, or by means of a contact lever that follows the motion of the pushbutton due to the action of a spring. In order to avoid premature return of the contact lever when the pushbutton ceases to be depressed, the invention provides that the contact lever be also in the form of a locking device. By acting on the pushbutton, the lever prevents it from returning to the starting position before the executing motion or period of the shutter is terminated.

It is another additional object of this invention to provide an actuating device coupled to the shutter blade system, and associated with the contact lever so as to guide and move the lever out of the contact or locking position when the shutter blade(s) return to the starting position. As disclosed by this invention, a particularly advantageous structural configuration can be obtained when the actuating device is formed of a connecting rod which rests, at one end, on a projection of the pushbutton due to the action of a spring. The other end of the connecting rod is articulately connected to a two-armed rocker lever whose free arm bears against the shutter blade system by means of a spring.

Other objects and advantages are set forth in greater detail in the following specification taken in conjunction with accompanying drawings which describe two shutter arrangements with different kinds of shutter blade systems, and in which--

FIG. 1 is the functional diagram of a shutter which can be controlled by means of an electronic switching device, and which comprises a single electromagnetically operable shutter blade. A control button is included, which cooperates with the contact switch of the driving system, as well as with an actuating device controllable by the shutter blade.

FIG. 2 shows members of the electromagnetic driving system illustrated in FIG. 1, when the shutter blade system is formed of a plurality of shutter blades that are moved by a common driving member.

FIG. 3 shows the control button of the electronic operating device in the depressed position, whereby the contact switch had been actuated by the contact lever, and the control button is locked.

FIG. 4 shows the situation when the control button is unlocked, but remains depressed. The contact lever has already been reset to the starting position by the actuating device.

In accordance with FIGS. 1 to 4 inclusive, the baseplate of the photographic shutter is denoted by 1. This baseplate is provided with a lens aperture 1a for exposing the film, and it is also adapted for the attachment and positioning of various members. For example, the plate 1 is provided with a pin 2, on which a shutter blade 3 covering the lens aperture 1a is rotatably positioned. The shutter blade 3 is best designed in the form of a wing, and provided with a leverlike extension 3a in the region of its bearing. The extension 3a serves as a mounting for a permanent magnet 4. Also fixed to the baseplate, is an electromagnet which is formed essentially of a U-shaped iron core 5 and a magnet coil 6. The arrangement with respect to these magnets is such that the free end of the permanent magnet 4 projects between the two opposing poles 5a and 5b of the electromagnet 5–6. As shown in FIG. 1, it is important that when the shutter blade 3 is in the closing position, the permanent magnet 4 engages the pole 5a with its free end as, for example, the south pole, S. In the open position of the shutter blade, this same pole of magnet 4 engages the pole 5b as shown by dash and dot lines in FIG. 1.

When electromagnet 5–6 is deenergized, the permanent magnet 4 clings, due to its own magnetic field, to that pole of electromagnet 5–6, against which it was manually placed. This would ordinarily be pole 5a, because the engagement of this pole by the permanent magnet corresponds to the closing position of shutter blade 3. It will become apparent from what follows, that the holding strength of the permanent magnet 4 is reinforced by the residual magnetism which prevails in electromagnet 5–6 after each actuating process. The north pole of the residual magnetism corresponds to pole 5a.

The magnet coil 6 of the electromagnet 5–6 has two terminals 6a and 6b as well as tap 6c located between these two terminals. The tap subdivides the magnet coil 6 into two winding sections, namely 6a–6c and 6b–6c. Connected to the preceding terminals is a control device that is best in the form of a monostable multivibrator circuit. The circuit is provided with a source of energy E, a contact switch K, a variable resistor R, a variable capacitor C, and a plurality of transistors $T_1$, $T_2$, and $T_3$.

Connected in series with the contact switch K, are transistor $T_1$ and the electromagnet winding section 6a–6c. Switch K may consist of two fixed junctions I and II, and a switching blade 7 capable of moving back and forth between these junctions. Capacitor C is electrically connected to the second transistor $T_2$ as well as the resistor R. The combination of resistor R and capacitor C forms the time constant or time delay of the circuit. A third transistor $T_3$ is connected in parallel to the aforementioned RC circuit, as well as to the section 6b–6c of magnet coil 6. The circuit is such that the collector current of transistor $T_3$ flows through the coil in the direction from terminal 6b to tap 6c. The other resistors, which have no reference numerals in the wiring diagram, serve to bias and complete the preceding electronic circuit.

As illustrated in FIG. 1, the switch K is actuated by a contact lever 8 which is mounted about a fixed pin and acted upon by a spring 9. The lever engages pushbutton button 10 which serves to supply the electromagnetic driving system with current. The pushbutton 10 is movable against the action of a compression spring 11, and is provided with a shoulder 10a which allows contact lever 8 to lock pushbutton 10 in the release position.

In addition to the contact lever 8, an actuating device may be associated with the pushbutton 10. This actuating device establishes a functionally responsive cross connection between the shutter blade system and the contact lever 8. The purpose of this arrangement is to assure that contact lever 8 which serves both to make contact and to lock the pushbutton 10, does not act on contact switch K longer than absolutely necessary, i.e., that an abrupt contact opening is made at the moment that the executing motion of the shutter is terminated. In the configuration of the electromagnetic driving system shown in FIG. 1, this effect can be readily obtained through the use of a connecting rod 12 which engages with one of its ends, a projecting pin 14 of the pushbutton 10, due to the action of a tension spring 13. To the other end of the connecting rod 12 may be coupled a two-armed rocker lever 15. This lever may be designed and positioned with respect to the shutter blade 3, so that a curved lever arm 15a bears against the extension 3a of the shutter blade 3, due to the action of a tension spring 16. Limiting stops 17 and 18 are associated with connecting rod 12 and with rocker 15 respectively, to prevent these links from moving beyond their prescribed paths as a result of tension springs 13 and 16.

The device described above for actuating the shutter blade system in an electromagnetic manner, operates as follows:

When pushbutton 10 is actuated against the action of the compression spring 11, contact lever 8 in bearing against the pushbutton, moves so that its locking edge 8a travels beyond and bears against the shoulder 10a. This action locks the pushbutton in place, and causes a counterclockwise rotation of the contact lever 8. The lever arm 8b, which is associated with he contact switch K, acts thereby on the blade 7 so that the latter contacts junction II. The contact switch K is thus closed, and current flows from the power supply E through the transistor $T_1$ and to terminal 6a, into section 6a–6c of the magnet coil 6, and then back to the power supply by way of tap 6c. During this state of the circuit, the transistors $T_2$ and $T_3$ are blocked, a south pole is generated at the location 5a of the electromagnet 5–6, and a north pole is generated at the opposite location 5b. This causes the result that the permanent magnet 4 whose south pole, S, had been held until now by the pole 5a, is suddenly repelled by this pole and at the same time attracted by pole 5b. the net effect of this action is that shutter blade 3, releasing the lens aperture 1a, transfers to the open position illustrated by dash-dot lines in FIG. 1.

Upon the closing of contact switch K, the capacitor C starts to become charged. The time required for charging the capacitor C to that voltage required for transistor $T_2$ to conduct, depends on the capacitance of this component as well as on the size of the resistor R. If either capacitor C or resistor R or both are variable, different exposure times can be obtained with the preceding shutter arrangement. If the base voltage of the transistor $T_2$ is reached during the functional period or executing motion of the operating device, the transistor $T_2$ will conduct and permit the passage of current. This has, in turn, the effect that transistor $T_1$ becomes cut off and transistor $T_3$ begins to conduct. The current now flows in electromagnet 5–6 from the terminal 6b through the section 6b–6c, i.e., in the direction opposite to the previous condition. As a result, a south pole forms at location 5b of the magnet core, and a north pole forms at location 5a. Accordingly, the permanent magnet 4 whose south pole had previously engaged location 5b of the electromagnet, is now repelled from this location while it is again attracted by location 5a of the electromagnet. This action causes shutter blade 3 to be transferred into the closing position.

As already indicated, actuation of the pushbutton 10 causes it to be locked in place by contact lever 8. The free end of the connecting rod 12 associated with the pushbutton, comes to rest thereby on the front end of the contact lever due to the action of the spring 13. However, at the instant that shutter blade 3 swings from the closed to the open position, the support from rocker lever 15 is withdrawn. Thereupon, the lever acted on by the tension spring 16, moves the connecting rod 12 to the left with respect to FIG. 1. During this process the free end of connecting rod 12 slides off the front end of contact lever 8, but the link is intercepted by the projection 14 of pushbutton 10. The resulting position which connecting rod 12 occupies with respect to the contact lever, is illustrated in FIG. 3.

If the shutter blade 3 now returns to the closed position, it imparts to rocker 15 an impulse which is transmitted to connecting rod 12. Contact lever 8 is thereby moved out of the position shown in FIG. 1, and into the position of FIG. 4. Contact switch K is thus reopened, and the corresponding circuit is thereby interrupted. If pushbutton 10 is now no longer depressed,—assuming that this has not already occurred—it is able to return to the initial or starting position due to the action of compression spring 11. During this motion the pushbutton takes along the free end of the connecting rod 12.

The actuating device described above avoids effectively functional disturbances of the shutter arising, for example, through wrong operation of the pushbutton 10 which serves to release the camera. Moreover, the arresting feature of contact lever 8 serves to prevent the circuit of the electronic operating device to become interrupted through premature release of pushbutton 10. On the other hand, an interruption of the circuit is brought about immediately upon termination of the exposure function, through the action of connecting rod 12 on contact lever 8. This latter condition results whether or not pushbutton 10 is held depressed beyond the actual exposure period, i.e., whether or not it is held in the release position. If it is desired, for any reason whatsoever, to dispense with the preceding device which serves as a guided control of the contact lever or contact switch, the arrangement of pushbutton 10 with respect to the contact switch K, may be such that the switch can be actuated directly. In this case the pushbutton 10 may engage directly the operating blade 7.

As already mentioned, the time for charging the capacitor C, and hence the open time of the shutter blade 3, may be made variable by adjusting the values of resistor R and capacitor C. If an automatic timing circuit is to be used, the variable capacitor C may be employed, as an example, for preselecting specific diaphragm apertures, or for taking into account different film speeds. The resistor R, on the other hand, may be in the form of a CdS cell. If, however, the camera is to be equipped with the electronic operating device, but not with an automatic timing circuit, the capacitor C can be coupled to, for example, an exposure time setting member—not shown in the drawing. In this case, different exposure times may be obtained through appropriate adjustments of resistor R and capacitor C, either separately or jointly, by means of the exposure time setting member.

In accordance with the configuration of FIG. 2, the preceding electromagnetic driving system may be similarly used in those photographic shutters which are equipped with a plurality of shutter blades 21 movable by a common driving member 20. In this situation, it is best to mount the permanent magnet 4' on the common driving member 20, and to support the rocker 15 which serves to actuate the contact switch, on a projection 20a of the driving member 20. The common driving member 20 carrying permanent magnet 4', is acted upon in the same manner as described in detail above for the configuration of FIG. 1. In addition to being used in conjunction with the two shutter arrangements described above, the electromagnetic driving system can be employed wherever the lens aperture is released by a reciprocating shutter blade, for the exposure process.

While this invention has been described in some detail, it will be understood by those skilled in the art that variations and modifications may be made without departing from the spirit thereof or the scope of the following claims.

We claim:

1. A photographic camera with shutter including a shutter blade system for covering the lens aperture of said camera and executing a reciprocating motion during the exposure period; a permanent magnet mounted on said shutter blade system and participating in the motion of said shutter blade system; said permanent magnet having one end with one pole mounted on said shutter blade system nd having the free end with the other pole extending from said shutter blade system; an electromagnet capable of polarity reversals, and electronic timing means controlling the polarity of said electromagnet, said electromagnet having two opposing poles providing a magnetic field therebetween, said permanent magnet being mounted on said shutter blade system with said free end with said other pole of said permanent magnet projecting into the magnetic field of said electromagnet, said free end of said permanent magnet with said other pole being engageable with the opposing poles of said electromagnet, said electromagnet being U-shaped with said opposing poles using positioned to engage said permanent magnet to hold said shutter blade system in the open position when one of said poles of said electromagnet is engaged by said free end of said permanent magnet, and to hold said shutter blade system in the closed position when the other of said poles of said electromagnet is engaged by said free end of said permanent magnet.

2. The photographic camera of claim 1, wherein said shutter blade system comprises a single pivoted and swivable blade, said single blade being the direct mounting for said permanent magnet.

3. The photographic camera of claim 2 wherein said shutter blade has extended surface to which said permanent magnet is mounted.

4. The photographic camera of claim 1 wherein said shutter blade system comprises a plurality of shutter blades movable by means of a common driving member, and said permanent magnet is mounted to said common driving member.

5. The photographic camera of claim 1 wherein said pole of said permanent magnet alternately engages the poles of said electromagnet during the opening and closing of said shutter blade system, the distance between the poles of said electromagnet being related to the path of motion of said permanent magnet such that said pole of said permanent magnet engages a corresponding pole of said electromagnet at each end of its path of motion.

6. The photographic camera of claim 1 wherein said electronic switching device comprises a contact switch to control the current through said electromagnet, and a pushbutton to actuate said contact switch and being adapted to release said camera.

7. A photographic camera with shutter comprising: a shutter blade system covering the lens aperture of said camera and executing a reciprocating motion during the exposure period; a permanent magnet coupled to said shutter blade system, and participating in the motion of said shutter blade system; an electromagnet capable of polarity reversals; and an electronic switching device controlling the polarity of said electromagnet, said electromagnet being associated with respect to said permanent magnet so that one pole of said permanent magnet projects into the magnetic field of said electromagnet and wherein said electronic switching device comprises a contact switch to control the current through said electromagnet, and a pushbutton to actuate said contact switch and being adapted to release said camera and wherein a lever acted upon by a spring follows the motion of said pushbutton and actuates said electronic switching device.

8. The photographic camera of claim 7 wherein said lever possesses a locking device acting upon said pushbutton to prevent the pushbutton from returning to its starting position prior to the termination of the executing period of said shutter.

9. The photographic camera of claim 8 wherein an actuating device settable by said shutter blade system, is associated with said contact lever to guide and move said lever out of the locking position when said shutter blade system returns to the starting position.

10. The photographic camera of claim 9 wherein said actuating device comprises: a connecting rod; a projection on said pushbutton; a spring acting on said connecting rod to retain one end of said rod engaged with said pushbutton projection; a two-armed rocker lever coupled by means of one arm to the other end of said connecting rod; and a spring acting on said rocker lever to retain the other arm of said rocker lever bearing against said shutter blade system.

11. A photographic camera with shutter comprising: a shutter blade system covering the lens aperture of said camera and executing a reciprocating motion during the exposure period; an electromagnet capable of polarity reversals; a contact switch controlling an electronic switching device, the latter controlling the current through said electromagnet; a pushbutton actuating said contact switch and being adapted to release said camera; a spring acting upon a lever to follow the motion of said pushbutton; a locking device associated with said lever and acting upon said pushbutton to prevent the pushbutton from returning to its starting position prior to termination of the executing period of said shutter; a connecting rod; a projection on said pushbutton; a spring acting on said connecting rod to retain one end of said rod engaged with said pushbutton projection; a rocker lever coupled to said connecting rod; a spring acting on said rocker lever to retain said rocker lever in contact with said shutter blade system; and a permanent magnet coupled to said shutter blade system, and participating in the motion of said shutter blade system, said permanent magnet having only one of its poles alternately engaging the poles of said electromagnet during the opening and closing of said shutter blade system, the distance between the poles of said electromagnet being related to the path of motion of said permanent magnet such that said pole of said permanent magnet engages a corresponding pole of said electromagnet at each end of its path of motion.

12. A photographic camera with shutter comprising: a shutter blade system covering the lens aperture of said camera and executing a reciprocating motion during the exposure period; a contact switch; an electronic switching device; a pushbutton actuating said contact switch and being adapted to release said camera; a lever acted upon by a spring to follow the motion of said pushbutton; a locking device associated with said lever and acting upon said pushbutton to prevent the pushbutton from returning to its starting position prior to the termination of the executing period of said shutter; an actuating device associated with said lever and coupled to said shutter blade system, to guide and move said lever out of the locking position when said shutter blade system returns to the starting position; a permanent magnet coupled to said shutter blade system, and participating in the motion of said shutter blade system; and an electromagnet controlled by said electronic switching device, the latter being activated by said contact switch and having its poles alternately engaged by (a) only one pole of said permanent magnet during the opening and closing of said shutter blade system, the distance between the poles of said electromagnet being related to the path of motion of said permanent magnet such that said pole of said permanent magnet engages a corresponding pole of said electromagnet at each end of its path of motion.

* * * * *